E. ROBBINS.
Soil Breaker and Irrigator.

No. 197,055.  Patented Nov. 13, 1877.

Witnesses
S. N. Piper
L. H. Miller

Inventor:
Elisha Robbins
by his attorney,
R. H. Eddy

UNITED STATES PATENT OFFICE.

ELISHA ROBBINS, OF COTUIT, MASSACHUSETTS.

IMPROVEMENT IN SOIL BREAKER AND IRRIGATOR.

Specification forming part of Letters Patent No. 197,055, dated November 13, 1877; application filed August 14, 1877.

*To all whom it may concern:*

Be it known that I, ELISHA ROBBINS, of Cotuit, in the county of Barnstable and State of Massachusetts, have invented a new and useful Soil Breaker and Irrigator; and do hereby declare the same to be described in the following specification and represented in the accompanying drawings, of which—

Figure 1:
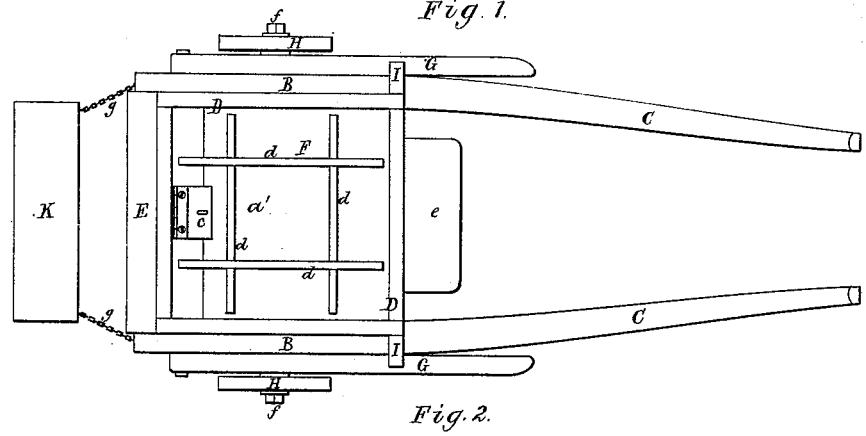
Figure 2:
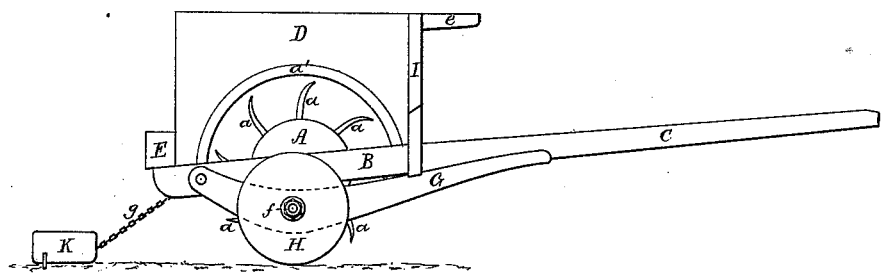
Figure 3:
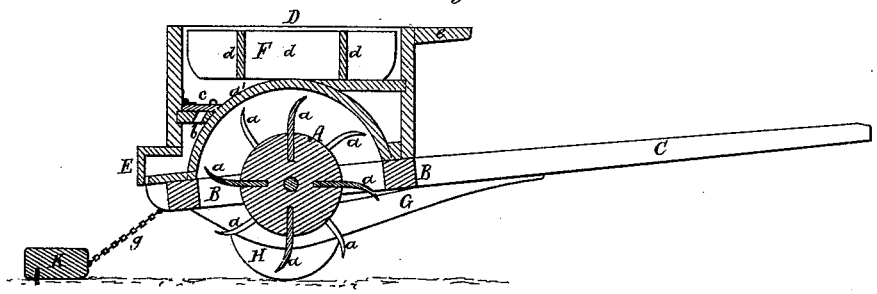
Figure 4:
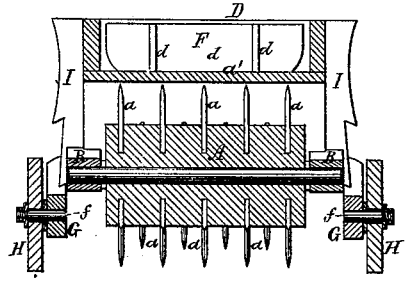

Figure 1 is a top view, Fig. 2 a side elevation, Fig. 3 a longitudinal section, and Fig. 4 a transverse section, of it.

This agricultural machine is to penetrate and break up or loosen the ground at and below its surface, and to irrigate it after such. By perforating the soil the water has a better chance to enter such, in order to speedily reach the roots of the plants therein, and less of it becomes lost by evaporation. Besides this, the land or soil is rendered better for the growth of the plants and for exposure to rain.

In the drawings, A denotes a cylinder or roll, studded with a series of teeth or prongs, $a$, extending from its periphery, as shown. This cylinder or shaft has its journals supported in bearings in a frame, B, provided with thills C C.

The part of each tooth that projects from the cylinder I prefer to have a curve lengthwise corresponding to, or nearly to, the arc of a cycloid, in order for it to enter the ground to the best advantage.

Over the said toothed cylinder is a tank or reservoir, D, having its bottom $a'$ arched with a radius whose center is in the axis of the cylinder, such bottom being arranged with the cylinder in manner as shown. There is also on the frame B a sprinkler, E, having numerous holes or perforations in its bottom. It is provided with a conduit, $b$, to lead into the reservoir, there being to such conduit a valve, $c$, for closing it, as occasion may require.

A grating, F, constructed of slats $d\ d\ d\ d$, arranged as shown, is placed within the reservoir, and is to float in the water, and to prevent it from swashing out of it while the machine may be in use.

To the reservoir there may be a driver's seat, as shown at $e$.

Furthermore, to each of the two opposite sides of the frame B there is pivoted a lever, G, carrying a wheel, H, such wheel, arranged as shown, being free to revolve on a pivot, $f$, projecting from the lever.

Racks I I, extending from the sides of the reservoir, answer to set the levers higher or lower, as occasion may require, to either raise the breaker entirely off the ground or to regulate the depths of its perforations therein.

For large and heavy machines I contemplate employing screws for raising or lowering or adjusting the levers.

There is also appended or fixed to the frame B, by chains or ropes $g\ g$, a heavy or weighted scraper, K, to rest and be drawn over the surface of the land in order to scrape and press down the soil after it may have been perforated or broken up by the breaking or perforating cylinder.

In using this machine the reservoir is to be supplied with water when it may be desirable to irrigate the soil; but in case it may be intended to merely break up or loosen the soil, there will be no necessity of any water in the reservoir.

While the machine is being drawn over the surface of the ground the breaker will revolve, and its teeth will penetrate the soil and loosen and break it up on passing out of it. The water discharged by the sprinkler falling directly on the ground so punctured and turned up, will easily penetrate it, and the strip-scraper will scrape it and press it down, and aid in forcing the water into it. The arched bottom of the reservoir may have teeth projecting from it, to work between those of the breaker, in order to remove from them any earth that may cling to them; but the arched bottom, with or without such teeth, is found to be useful in preventing the soil that may gather on the teeth from being discharged upon the heels of an animal employed between the thills to draw the machine along.

What I claim as my invention is as follows—that is to say:

1. The combination of the reservoir D and the sprinkler E with the rotary breaker and its supporting-frame.

2. The combination of the reservoir D and the sprinkler E with the rotary toothed breaker A $a$, its frame B, and the levers G G and their wheels H H, all being substantially as set forth.

3. The sprinkling-reservoir, provided with the arched bottom, arranged and constructed with the rotary toothed breaker and its supporting-frame, substantially as set forth.

ELISHA ROBBINS.

Witnesses:
R. H. EDDY,
JOHN R. SNOW.